US010184558B2

(12) United States Patent
Nomura et al.

(10) Patent No.: US 10,184,558 B2
(45) Date of Patent: Jan. 22, 2019

(54) CONTROL DEVICE AND CONTROL METHOD FOR ACTUATOR

(71) Applicant: HITACHI AUTOMOTIVE SYSTEMS, LTD., Hitachinaka-shi, Ibaraki (JP)

(72) Inventors: Takashi Nomura, Isesaki (JP); Koji Yuasa, Isesaki (JP)

(73) Assignee: HITACHI AUTOMOTIVE SYSTEMS, LTD., Hitachinaka-Shi (JP)

(*) Notice: Subject to any disclaimer, the term of this patent is extended or adjusted under 35 U.S.C. 154(b) by 25 days.

(21) Appl. No.: 15/537,586

(22) PCT Filed: Dec. 24, 2015

(86) PCT No.: PCT/JP2015/085945
§ 371 (c)(1),
(2) Date: Jun. 19, 2017

(87) PCT Pub. No.: WO2016/104567
PCT Pub. Date: Jun. 30, 2016

(65) Prior Publication Data
US 2018/0266543 A1    Sep. 20, 2018

(30) Foreign Application Priority Data

Dec. 24, 2014 (JP) ................. 2014-260851

(51) Int. Cl.
F16H 61/02    (2006.01)
G05B 11/36    (2006.01)
(Continued)

(52) U.S. Cl.
CPC ..... F16H 61/0006 (2013.01); F16H 61/0251 (2013.01); G05B 11/36 (2013.01); F16H 2059/683 (2013.01); F16H 2061/0258 (2013.01)

(58) Field of Classification Search
CPC ............ F16H 61/0006; F16H 61/0251; F16H 61/0021; F16H 61/12; F16H 2059/683;
(Continued)

(56) References Cited

U.S. PATENT DOCUMENTS

2009/0099810 A1* 4/2009 Schneider ............... F16D 48/06
702/150
2009/0299583 A1* 12/2009 Dell' Eva ............... F16H 59/68
701/51
2013/0297156 A1* 11/2013 Hansen ............... B60W 10/105
701/51

FOREIGN PATENT DOCUMENTS

JP    H01-159701 A    6/1989
JP    H08-148333 A    6/1996
(Continued)

Primary Examiner — Lindsay Low
Assistant Examiner — George Jin
(74) Attorney, Agent, or Firm — Foley & Lardner LLP

(57) ABSTRACT

A control unit (10) includes a microcontroller (100) that sets a duty ratio corresponding to a target current value of a linear solenoid (7a) and an ASIC (200) that supplies electricity to the linear solenoid (7a) based on the duty ratio. The microcontroller (100) includes a correction unit (110) that corrects a driving current value detected by a current sensor (300). The ASIC (200) includes a correction unit (206) that corrects the driving current value detected by the current sensor (300). A feedback amount selection unit (112) selects either one of the driving current value corrected by the correction unit (110) or the driving current value corrected by the correction unit (206) as a feedback amount corresponding to the target current value. A dual correction system is provided in a feedback control system.

14 Claims, 8 Drawing Sheets

(51) Int. Cl.
*F16H 61/00* (2006.01)
*F16H 59/68* (2006.01)

(58) Field of Classification Search
CPC ..... F16H 2061/0258; F16H 2061/0046; F16H 2061/0075; F16H 2061/0093; F16H 2061/1256; G05B 11/36; G05B 11/38
See application file for complete search history.

(56) References Cited

FOREIGN PATENT DOCUMENTS

| | | |
|---|---|---|
| JP | H09-317536 A | 12/1997 |
| JP | H10-225179 A | 8/1998 |

* cited by examiner

FIG. 7

| PATTERN | 1 | 2 | 3 |
|---|---|---|---|
| LINEAR SOLENOID OUTPUT DIAGNOSIS | NOT DIAGNOSED | NORMAL → ABNORMAL | NORMAL → ABNORMAL → ABNORMAL |
| PERFORMED ABNORMALITY PROCESSING | STOP LINEAR SOLENOID OUTPUT | SWITCH MAIN/SUB SETTING FOR CORRECTION METHOD → STOP LINEAR SOLENOID OUTPUT | NONE → SWITCH MAIN/SUB SETTING FOR CORRECTION METHOD → STOP LINEAR SOLENOID OUTPUT |

CONTROL DEVICE AND CONTROL METHOD FOR ACTUATOR

TECHNICAL FIELD

The present invention relates to a control device for actuator configured to feed back the control amount of an actuator to regulate the operating amount for feedback control and such a method for controlling.

BACKGROUND ART

A conventional oil supplying system for vehicle transmission, for example, includes a control device for a linear solenoid as an actuator to drive an oil pressure regulating valve, and the control device is configured to control the oil pressure with the linear solenoid.

In such a control device for actuator, the value of driving current detected by a current sensor (hereinafter called a "detected current value") is used as the control amount of the linear solenoid. This detected current value is corrected using a correction coefficient stored beforehand in a memory so as to reduce fluctuations in electric property of the driving current calculation unit and the current sensor and so bring the detected current value to an actual current value that is a value of the actual driving current. Then feed-back control is performed so as to bring a corrected current value, which is obtained by correcting the detected current value, to a target current value (see Patent Document 1, for example).

REFERENCE DOCUMENT LIST

Patent Document

Patent Document 1: Japanese Patent Application Laid-Open No. 10-225179

SUMMARY OF THE INVENTION

Problems to be Solved by the Invention

However, if the memory to store the correction coefficient or an element to calculate the corrected current value breaks down or deteriorates in such a control device for actuator, correction accuracy of the detected current value will be degraded. This often causes a difference between the corrected current value and the actual current value. This results in difficulty to calculate an adequate operating amount in accordance with the actual current value of the linear solenoid, and so causes wasted consumption of electricity by the linear solenoid and reduces fuel economy. This also causes shift shock due to a large difference between the corrected current value and the actual current value when the gears are shifted.

In view of these problems, the present invention aims to provide a control device for actuator including a reliable feedback control system, and such a method for controlling.

Means for Solving the Problems

To this end, a control device for actuator according to the present invention includes: a control circuit configured to set an operating amount of an actuator in accordance with a target control amount of the actuator; a driving circuit configured to supply electricity to the actuator based on the set operating amount; and a sensor configured to detect a control amount of the actuator. The control circuit includes a first correction unit configured to correct a control amount detected by the sensor, and the driving circuit includes a second correction unit configured to correct a control amount detected by the sensor. The control circuit performs feedback of at least one of the control amount corrected by the first correction unit and the control amount corrected by the second correction unit for feedback control to regulate the operating amount.

A method for controlling an actuator according to the present invention is to control electricity supplied to the actuator based on an operating amount of the actuator set in accordance with a target control amount of the actuator. A controller of the actuator includes: a first correction unit configured to correct a control amount of the actuator detected and a second correction unit configured to correct a control amount of the actuator detected. Feedback control to regulate the operating amount of the actuator is performed based on any one of the control amount corrected by the first correction unit and the control amount corrected by the second correction unit, and the target control amount.

Effects of the Invention

According to the control device for actuator and the method for controlling according to the present invention, a dual correction system is provided to correct the control amount as the feedback amount. This configuration can improve the reliability of the feedback control system against malfunctions and deteriorations of a memory to store the correction coefficient and of an element to calculate the corrected current value.

BRIEF DESCRIPTION OF THE DRAWINGS

FIG. 7 is a table illustrating specific examples of the abnormality processing.

MODE FOR CARRYING OUT THE INVENTION

Figure 1:
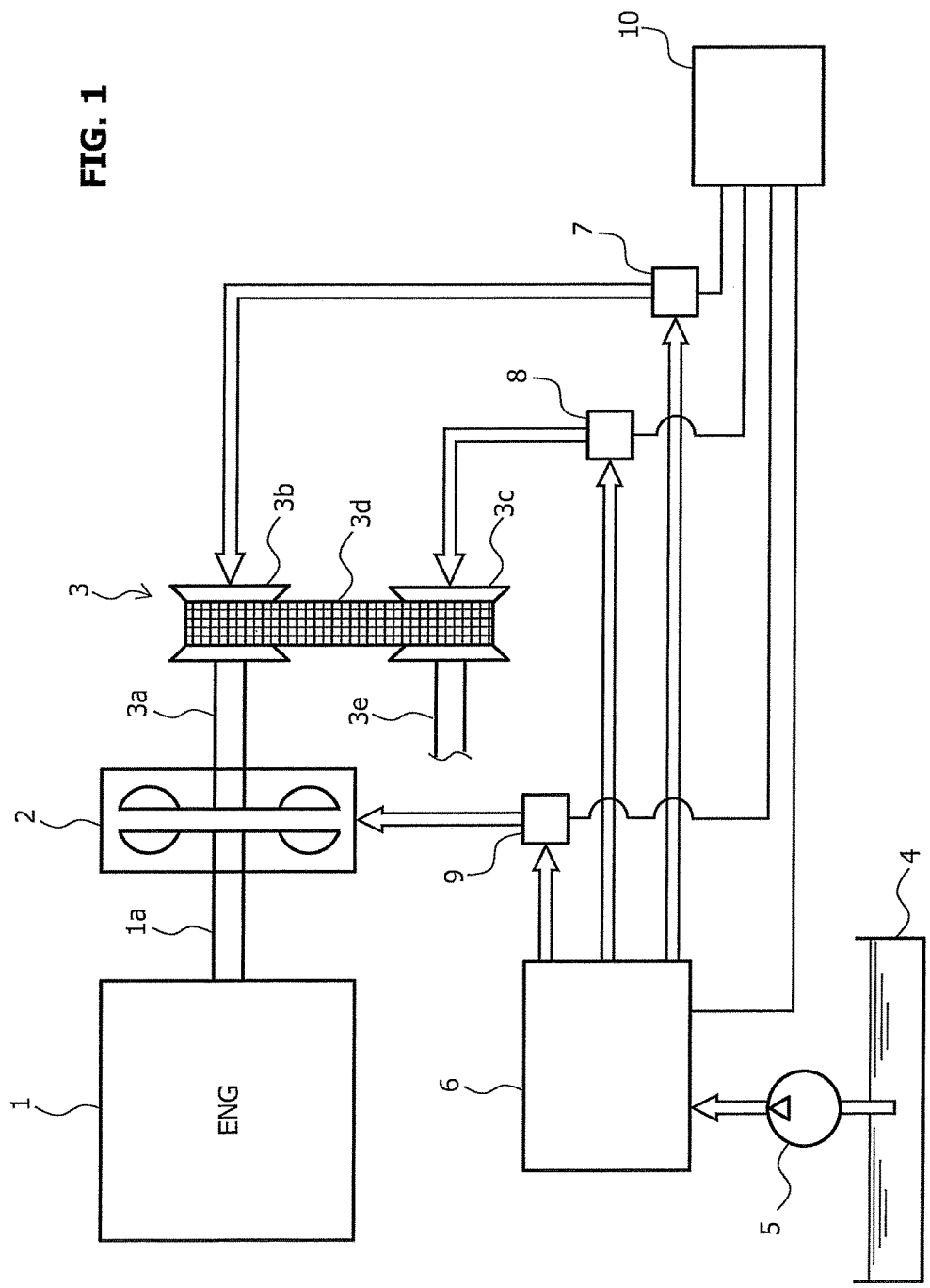
FIG. 1 schematically illustrates an oil supplying system in a vehicle transmission.

The following describes embodiments of the present invention in details. FIG. 1 schematically illustrates an oil supplying system in a vehicle transmission to describe one embodiment of the present invention.

An engine (internal combustion engine) 1 as a power source of the vehicle has an engine output shaft 1a to transmit the rotation output. This engine output shaft 1a is connected to a transmission input shaft 3a of a continuously variable transmission 3 via a torque converter 2. Torque converter 2 includes a lock-up mechanism (not illustrated) to directly join engine output shaft 1a to transmission input shaft 3a depending on the vehicle speed.

Continuously variable transmission 3 includes a primary pulley 3b and a secondary pulley 3c as well as a belt 3d wound around these pulleys. The rotation of primary pulley 3b by transmission input shaft 3a is transmitted to secondary pulley 3c via belt 3d. The rotation of secondary pulley 3c is then transmitted to a driving wheel not illustrated via transmission output shaft 3e.

In continuously variable transmission 3, a pair of movable conical plates of primary pulley 3b and a pair of movable conical plates of secondary pulley 3c along their shafts are moved by controlling the oil pressure of the operating oil. Such a movement changes the radius of the contacting position of primary pulley 3b and secondary pulley 3c with belt 3d, and so changes the pulley ratio (rotating ratio) of primary pulley 3b and secondary pulley 3c. In this way, the transmission gear ratio can be changed continuously.

An oil pan 4 is disposed at a bottom part of the casing of continuously variable transmission 3. Oil accumulated in oil pan 4 is sucked and pressurized by an oil-pressure pump 5 that is disposed in the casing of continuously variable transmission 3. Oil-pressure pump 5 is driven by transmission input shaft 3a, i.e., practically by the rotation output of engine 1. Oil sucked and pressurized by oil-pressure pump 5 is supplied as operating oil from oil-pressure pump 5 to primary pulley 3b, secondary pulley 3c and the lock-up mechanism of torque converter 2 via a line-pressure control unit 6.

An input-side pulley pressure control unit 7 is provided for primary pulley 3b, and oil passing through line-pressure control unit 6 is supplied to primary pulley 3b via input-side pulley pressure control unit 7. An output-side pulley pressure control unit 8 is provided for secondary pulley 3c, and oil passing through line-pressure control unit 6 is supplied to secondary pulley 3c via output-side pulley pressure control unit 8. A lock-up pressure control unit 9 is provided for torque converter 2, and oil passing through line-pressure control unit 6 is supplied to the lock-up mechanism via lock-up pressure control unit 9.

Each of line-pressure control unit 6, input-side pulley pressure control unit 7, output-side pulley pressure control unit 8, and lock-up pressure control unit 9 includes a linear solenoid, and this linear solenoid functions as an actuator to drive the oil pressure regulating valve to regulate the discharge pressure from oil-pressure pump 5. These linear solenoids are driven individually by a control unit (control device for actuator) 10.

Figure 2:
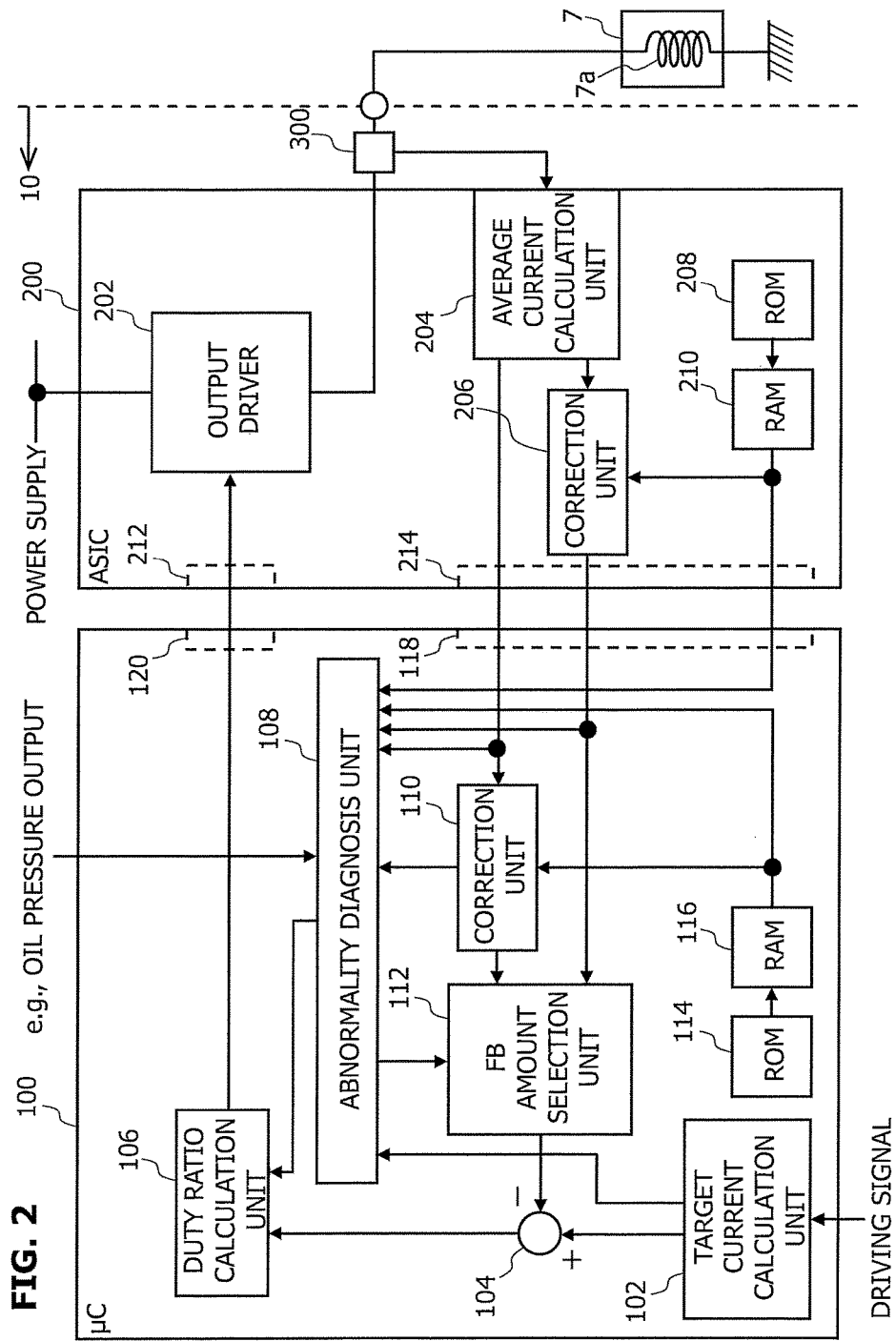
FIG. 2 is a functional block diagram of a control device for actuator.

FIG. 2 is a functional block diagram of control unit 10. Control unit 10 includes a microcontroller (in the drawing, this is abbreviated as "µC", the same applies hereafter) 100 having a built-in computer, and an ASIC (Application Specific Integrated Circuit) 200 that is an integrated circuit for specific application. Microcontroller 100 is electrically connected to linear solenoid 7a built in input-side pulley pressure control unit 7 via ASIC 200.

Microcontroller 100 makes up a control circuit that sets a target current value that is the target control amount of linear solenoid 7a and calculates the operating amount in accordance with this target current value. ASIC 200 makes up a driving circuit that supplies electricity to linear solenoid 7a based on the operating amount calculated by microcontroller 100. Microcontroller 100 is configured to regulate the operating amount of linear solenoid based on the target current value and the driving current that is the controlling amount of linear solenoid 7a for current feedback control.

Control unit 10 includes a current sensor 300 between ASIC 200 and linear solenoid 7a. Current sensor 300 detects the driving current of linear solenoid 7a, and outputs the detected signal to ASIC 200. Current sensor 300 may be a known current detecting means, such as a shunt resistance that is serially connected between ASIC 200 and linear solenoid 7a, for example.

FIG. 2 illustrates linear solenoid 7a built in input-side pulley pressure control unit 7 for convenience sake as an example of the linear solenoid connected to microcontroller 100 via ASIC 200. This linear solenoid 7a built in input-side pulley pressure control unit 7 may be replaced with another linear solenoid included in line-pressure control unit 6, output-side pulley pressure control unit 8, or lock-up pressure control unit 9, and the following descriptions apply to this.

ASIC 200 includes an output driver 202, an average current calculation unit 204, a correction unit (second correction unit) 206, a non-volatile memory 208, such as ROM (Read-Only Memory), and a volatile memory 210, such as RAM (Random Access Memory).

Output driver 202 receives an instruction signal for operating amount, which is calculated as described later by microcontroller 100, as an input via an input port 212, and turns on or off a built-in switching element in accordance with this instruction signal to control electricity supplied from the power supply to linear solenoid 7a.

Average current calculation unit 204 includes an A/D (Analog to Digital) converter to convert an analog detected signal on driving current of linear solenoid 7a, the analog detected signal being output from current sensor 300 to ASIC 200, to a digital value. Average current calculation unit 204 calculates an average current value of the detected current value converted by the A/D converter into a digital value. This calculation is to average the detected current values every predetermined time or after predetermined number of times of A/D conversion in order to reduce fluctuations in current due to influences from noise, for example.

Average current calculation unit 204 sends the obtained average current value to correction unit 206, and outputs the same to micro-controller 100 via a communication interface 214 to perform SPI (Serial Peripheral Interface) communication, for example.

Correction unit 206 is configured to read a correction coefficient (hereinafter called "ASIC correction coefficient") stored beforehand in non-volatile memory 208 via volatile memory 210, and correct the average current value with this ASIC correction coefficient to calculate a corrected current value (hereinafter called "ASIC corrected current value"). That is, correction unit 206 substantially corrects the detected current value by correcting the average current value. ASIC corrected current value calculated by correction unit 206 is output to microcontroller 100 via communication interface 214.

The ASIC correction coefficient stored beforehand in non-volatile memory 208 is used for correction of the average current value as stated above to reduce a difference between the average current value and the value of the actual driving current (hereinafter called "actual current value") flowing through linear solenoid 7a. This ASIC correction coefficient is a value specific to control unit 10, which is determined based on variations in electrical properties in the element and the circuit relating to the detection of driving current, such as current sensor 300 and average current calculation unit 204 of ASIC 200.

The types of non-volatile memory 208 are not limited especially. When there is a need to rewrite the ASIC correction coefficient, an EEPROM (Electrically Erasable Programmable Read-Only Memory) or a flash memory enabling writing and erasing may be used. The same applies to non-volatile memory in microcontroller 100 described later.

In ASIC 200, correction unit 206, non-volatile memory 208 and volatile memory 210 make up one correction system to correct the average current value.

Microcontroller 100 includes a target current calculation unit 102, a subtraction unit 104, a duty ratio calculation unit 106, an abnormality diagnosis unit 108, a correction unit 110, a feedback (abbreviated as "FB" in the drawing) amount selection unit 112, a non-volatile memory 114, such as a ROM, and a volatile memory 116, such as a RAM.

The processing at target current calculation unit 102, subtraction unit 104, duty ratio calculation unit 106, abnormality diagnosis unit 108, correction unit (first correction unit) 110, and feedback amount selection unit 112 is implemented by reading a program stored in non-volatile memory 114 via non-volatile memory 116 and executing the program by a CPU (Central Processing Unit) built in microcontroller 100, for example. The processing at target current calculation unit 102, subtraction unit 104, duty ratio calculation unit 106, abnormality diagnosis unit 108, correction unit 110, and feedback amount selection unit 112 may be implemented by the hardware configuration.

Target current calculation unit 102 determines target oil pressure of oil to be supplied from input-side pulley pressure control unit 7 to primary pulley 3b based on driving signals from the outside, such as a manipulation signal of a selector lever manipulated by the driver and an input signal on the vehicle operating state from an engine control unit, and sets a target current value as a target control amount of linear solenoid 7a corresponding to the target oil pressure.

The target current value can be set based on a map stored beforehand in non-volatile memory 114, the map including a correspondence between oil pressure of oil to be supplied from input-side pulley pressure control unit 7 to primary pulley 3b and the current value of linear solenoid 7a. The target current value can be set by referring to the map read from non-volatile memory 114 to volatile memory 116 during the operating of the vehicle and calculating a current value corresponding to the target oil pressure.

Correction unit 110 reads the average current value calculated by average current calculation unit 204 of ASIC 200 from ASIC 200 via communication interface 118 to perform SPI communication or the like. Then correction unit 110 is configured to read a correction coefficient (hereinafter called "μC correction coefficient") stored beforehand in non-volatile memory 114 via volatile memory 116, and correct the average current value with this μC correction coefficient to calculate a corrected current value (hereinafter called "μC corrected current value"). That is, correction unit 110 substantially corrects the detected current value by correcting the average current value.

The μC correction coefficient is the same value as the ASIC correction coefficient. A method for correcting the average current value with this μC correction coefficient also is the same as the method for correcting the average current value with the ASIC correction coefficient.

In micro-controller 100, correction unit 110, non-volatile memory 114 and volatile memory 116 make up another correction system to correct the average current value that is added to the correction system of the average current value in ASIC 200.

Abnormality diagnosis unit 108 reads the μC correction coefficient from non-volatile memory 114 via volatile memory 116 and reads the ASIC correction coefficient from non-volatile memory 208 via volatile memory 210 and communication interfaces 214 and 118. Then abnormality diagnosis unit 108 compares these read two correction coefficients and diagnoses whether any abnormality occurs or not in data transfer from non-volatile memory 114 to volatile memory 116 or from non-volatile memory 208 to volatile memory 210, or in storage of the correction coefficients at non-volatile memories 114, 208 or volatile memories 116, 210. Such diagnosis is one of criteria by which abnormality diagnosis unit 108 diagnoses whether abnormality occurs or not in current feedback control.

Abnormality diagnosis unit 108 reads the ASIC corrected current value calculated by correction unit 206 of ASIC 200 via communication interface 118, and compares this with the μC corrected current value calculated by correction unit 110 of microcontroller 100 and diagnoses whether any abnormality occurs or not in correction of the average current value at correction units 110, 206, i.e., the processing relating to the calculation of the corrected current values. Such diagnosis is one of criteria by which abnormality diagnosis unit 108 diagnoses whether abnormality occurs or not in current feedback control.

Abnormality diagnosis unit 108 reads the average current value obtained at average current calculation unit 204 of ASIC 200 from ASIC 200 via communication interface 118, and compares the average current value obtained when the ASIC corrected current value is selected as the feedback amount and the average current value obtained when the μC corrected current value is selected as the feedback amount and diagnoses whether any abnormality occurs or not in the output from control unit 10 to linear solenoid 7a. Such diagnosis is one of criteria by which abnormality diagnosis unit 108 diagnoses whether abnormality occurs or not in current feedback control.

Abnormality diagnosis unit 108 diagnoses whether any abnormality occurs or not in the output from linear solenoid 7a as the actuator.

For instance, abnormality diagnosis unit 108 can compare target oil pressure that is a base of setting of the target current value at target current calculation unit 102 and the oil pressure of oil supplied from input-side pulley pressure control unit 7 to primary pulley 3b and diagnose abnormality in the output from linear solenoid 7a based on the result of comparison. Alternatively abnormality diagnosis unit 108 may be configured to detect the opening degree of an oil pressure regulating valve in input-side pulley pressure control unit 7 by linear solenoid 7a, compare the detected opening degree with an opening degree to yield the target oil pressure, and diagnose abnormality in the output from linear solenoid 7a as the actuator.

Based on the result of abnormality diagnosis as stated above, abnormality diagnosis unit 108 performs processing to be performed for abnormality (this may be called abnormality processing) to duty ratio calculation unit 106 and feedback amount selection unit 112.

Feedback amount selection unit 112 selects, as the feedback amount, any one of the μC corrected current value calculated by correction unit 110 of microcontroller 100 and the ASIC corrected current value calculated by correction unit 206 of ASIC 200. That is, feedback amount selection unit 112 selects any one of the ASIC correction method to correct the average current value by correction unit 206 of ASIC 200 and the microcontroller correction method to correct the average current value by executing a program by correction unit 110 of microcontroller 100.

Specifically feedback amount selection unit 112 is configured to switch the two correction methods with a predetermined execution time ratio or with a predetermined number of times of execution ratio in order to diagnose abnormality in current feedback control. For instance, feedback amount selection unit 112 may switch the correction methods by selecting the ASIC corrected current value by the ASIC correction method three successive times, and then selecting the μC corrected current value by the microcontroller correction method once. Thereby abnormality diagnosis unit 108 can compare the average current values calculated by both of the ASIC correction method and the microcontroller correction method. In the following description, the correction method having relatively larger execution time ratio or execution number of times ratio is called a main correction method, and the other correction method having a smaller ratio is called a sub correction method. The main correction method is used normally for current feedback control, and the sub correction method is used for comparison of the average current value with the main correction method. In this way, feedback amount selection unit 112 sets the ASIC correction method as one of the main correction method and the sub correction method and sets the microcomputer correction method as the other of them.

When abnormality diagnosis unit 108 does not perform abnormality processing, feedback amount selection unit 112 switches the main correction method into one correction method set as the sub correction method and switches the sub correction method into the other correction method set as the main correction method to improve the accuracy of abnormality diagnosis.

For the abnormality processing by abnormality diagnosis unit 108, feedback amount selection unit 112 switches the main correction method into one correction method set as the sub correction method and switches the sub correction method into the other correction method set as the main correction method.

Subtraction unit 104 calculates deviation between the target current value set by target current calculation unit 102 and the corrected current value (any one of the ASIC corrected current value and the μC corrected current value) selected by feedback amount selection unit 112.

Duty ratio calculation unit 106 calculates a duty ratio between on and off of the switching element at output driver 202 based on the deviation between the target current value and the corrected current value calculated by subtraction unit 104. This calculation is performed by a well-known calculation method, such as proportional integral control (PI control) or proportional integral derivative control (PID control). Then duty ratio calculation unit 106 outputs a PWM signal of such a duty ratio to ASIC 200 via an output port 120 as an instruction signal of the operating amount.

Figure 3:
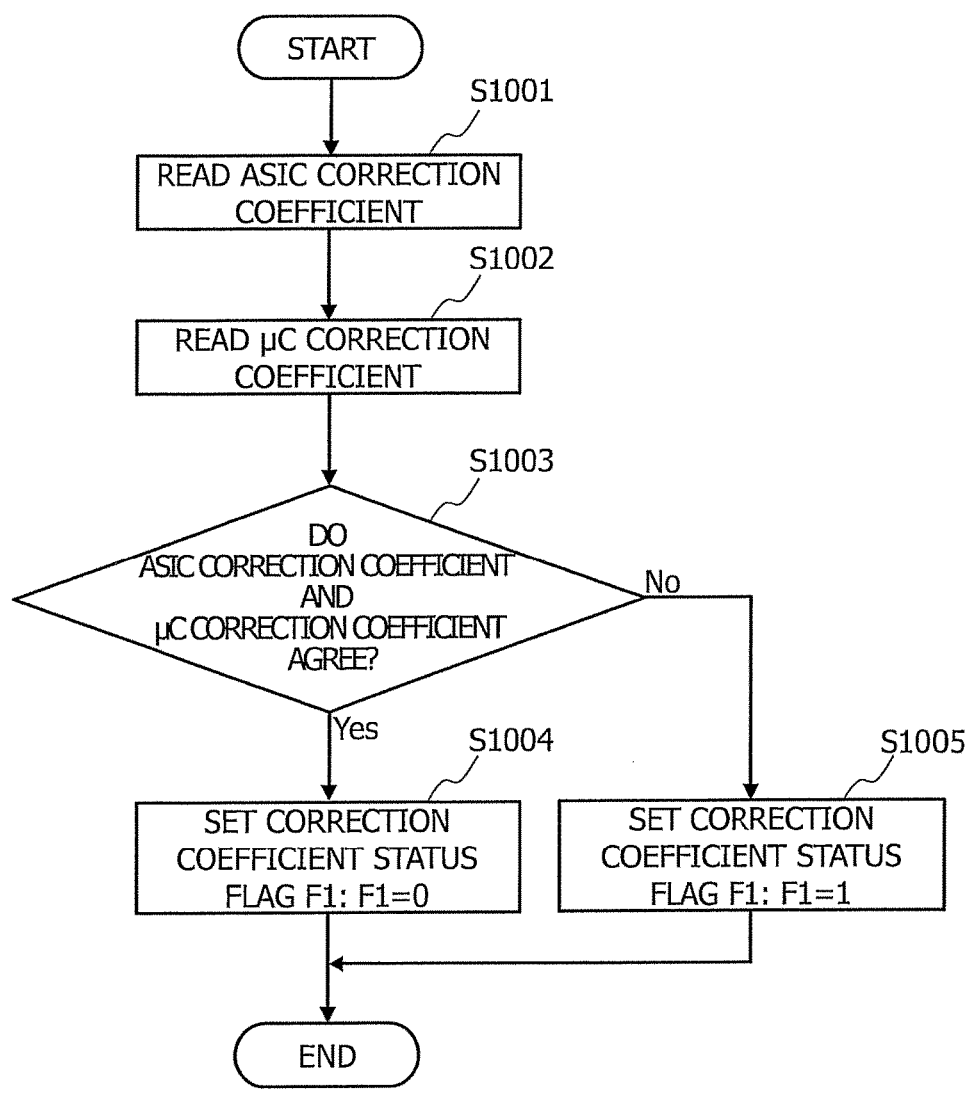
FIG. 3 is a flowchart illustrating the abnormality diagnosis processing targeted at a correction coefficient.

FIG. 3 is a flowchart illustrating the abnormality diagnosis processing that micro-controller 100 performs every predetermined time Δt1 after the ignition key of the vehicle is turned on. This processing is targeted at the correction coefficient.

At step 1001 (abbreviated as "S1001" in the drawing, the same applies hereafter), abnormality diagnosis unit 108 reads an ASIC correction coefficient from non-volatile memory 208 of ASIC 200 via volatile memory 210 and communication interfaces 214, 118.

At step 1002, abnormality diagnosis unit 108 reads μC correction coefficient from non-volatile memory 114 of microcontroller 100 via volatile memory 116.

At step 1003, abnormality diagnosis unit 108 compares the ASIC correction coefficient and the μC correction coefficient and determines whether these correction coefficients agree or not.

The ASIC correction coefficient and the μC correction coefficient agree when they are stored in non-volatile memories 114 and 208. Therefore if it is determined that the ASIC correction coefficient and the μC correction coefficient do not agree, abnormality may occur in the data transfer of the correction coefficients from non-volatile memory 114 to volatile memory 116 or from non-volatile memory 208 to volatile memory 210, or in the storage at non-volatile memory 114 or 208 or volatile memory 116 or 210.

Therefore when it is determined at step 1003 that the ASIC correction coefficient and the μC correction coefficient agree, it is diagnosed that the storage and the data transfer of the correction coefficients are normal, and the procedure shifts to step 1004 (Yes). On the contrary, when it is determined that the ASIC correction coefficient and the μC correction coefficient do not agree, it is diagnosed that the storage and the data transfer of the correction coefficients are abnormal, and the procedure shifts to step 1005 (No).

At step 1004, abnormality diagnosis unit 108 sets a correction coefficient status flag F1 showing the abnormal/normal status relating to the storage and the data transfer of the correction coefficients at a value indicating the normal status (e.g., 0) and stores this value in volatile memory 116.

At step 1005, abnormality diagnosis unit 108 sets the correction coefficient status flag F1 showing the abnormal/normal status relating to the storage and the data transfer of the correction coefficients at a value indicating the abnormal status (e.g., 1) and stores this value in volatile memory 116.

Figure 4:
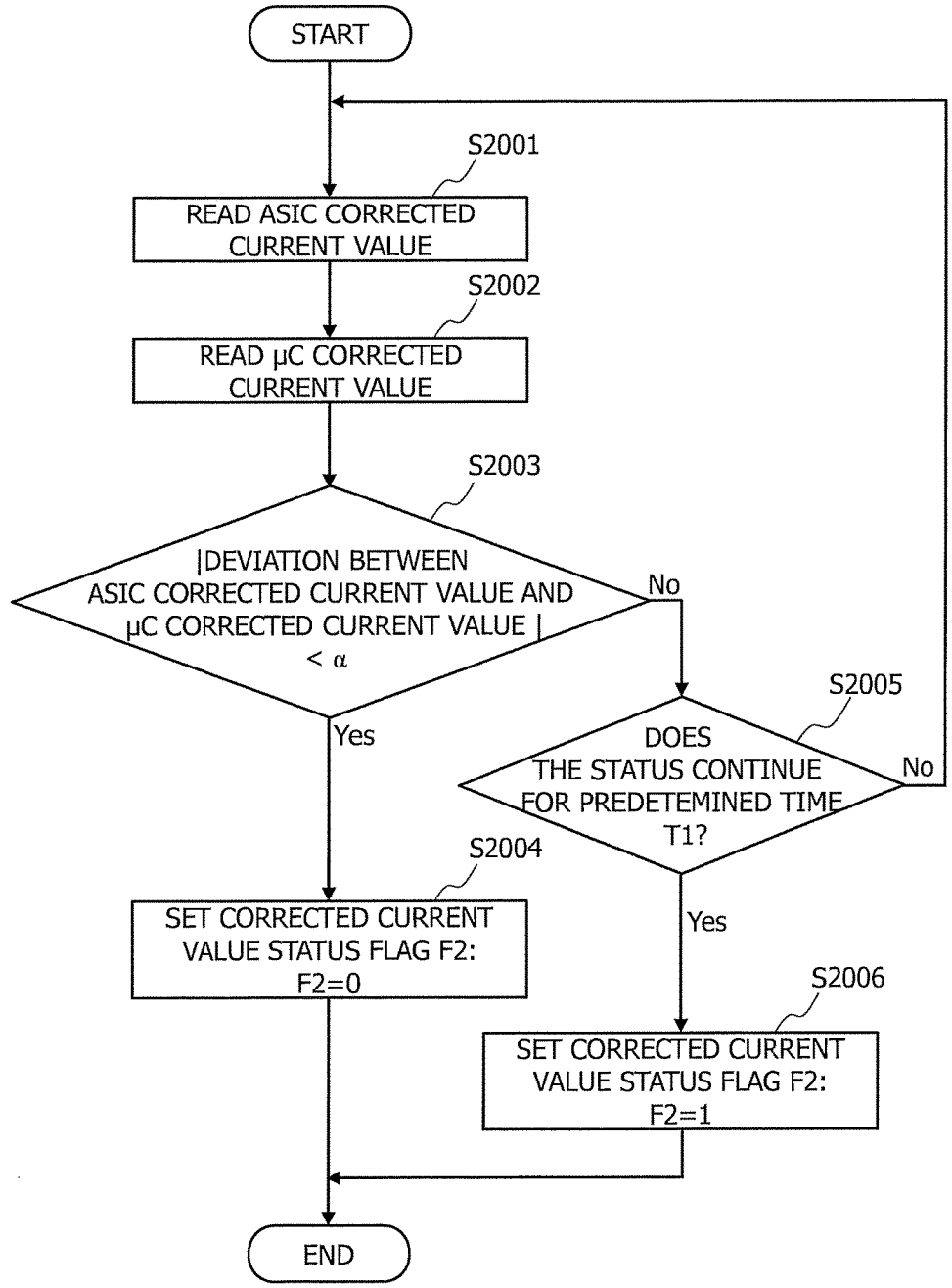
FIG. 4 is a flowchart illustrating the abnormality diagnosis processing targeted at a corrected current value.

FIG. 4 is a flowchart illustrating the abnormality diagnosis processing that micro-controller 100 performs every predetermined time Δt2 after the ignition key of the vehicle is turned on. This processing is targeted at the corrected current value.

At step 2001, abnormality diagnosis unit 108 obtains the ASIC corrected current value calculated by correction unit 206 via communication interfaces 214, 118.

At step 2002, abnormality diagnosis unit 108 obtains the μC corrected current value calculated by correction unit 110.

At step 2003, abnormality diagnosis unit 108 compares the ASIC corrected current value and the μC corrected current value and determines whether deviation (absolute value) between the ASIC corrected current value and the μC corrected current value is less than a predetermined value α (α>0) or not. The predetermined value α is a threshold as to whether the ASIC corrected current value obtained at step 2001 and the μC corrected current value obtained at step 2002 have a significant difference or not.

If the two corrected current values calculated at correction unit 110 and correction unit 206 have a significant difference when the correction coefficients read by correction coefficient 110 and correction coefficient 206 agree, abnormality may occur at the calculation of the corrected current value at correction unit 110 or correction unit 206.

Therefore when it is determined at step 2003 that the deviation (absolute value) between the ASIC corrected current value and the μC corrected current value is less than the predetermined value α, it is diagnosed that the calculation of the corrected current values at correction unit 110 and correction unit 206 is normal, and the procedure shifts to step 2004 (Yes). On the contrary, when it is determined that the deviation (absolute value) between the ASIC corrected current value and the μC corrected current value is the predetermined value α or more, it is diagnosed that abnormality occurs at the calculation of the corrected current value at correction unit 110 or correction unit 206, and the procedure shifts to step 2005 (No).

At step 2004, abnormality diagnosis unit 108 sets a corrected current value status flag F2 showing the abnormal/normal status relating to the calculation of corrected current value at a value indicating the normal status (e.g., 0) and stores this value in volatile memory 116.

At step 2005, abnormality diagnosis unit 108 determines whether the status having the deviation (absolute value) between the ASIC corrected current value and the μC corrected current of the predetermined value α or more continues for predetermined time T1 or not. This is for considering the case where the deviation (absolute value) between the ASIC corrected current value and the μC corrected current is the predetermined value α or more because the detected current value and accordingly the average current value or the corrected current value are influenced from temporary noise or the like, and is to avoid wrong diagnosis.

Therefore when it is determined at step 2005 that the status having the deviation (absolute value) between the ASIC corrected current value and the μC corrected current of the predetermined value α or more continues for predetermined time T1, it is diagnosed that abnormality occurs at the calculation of the corrected current value at correction unit 110 or correction unit 206, and the procedure shifts to step 2006 (Yes). On the contrary, when it is determined that the status having the deviation (absolute value) between the ASIC corrected current value and the μC corrected current of the predetermined value α or more does not continue for predetermined time T1, the procedure returns to step 2001 (No) to diagnose again whether abnormality occurs at the calculation of the corrected current values at correction unit 110 and correction unit 206 or not.

At step 2006, abnormality diagnosis unit 108 sets the corrected current value status flag F2 showing the abnormal/normal status relating to the calculation of corrected current value at a value indicating the abnormal status (e.g., 1) and stores this value in volatile memory 116.

Figure 5:
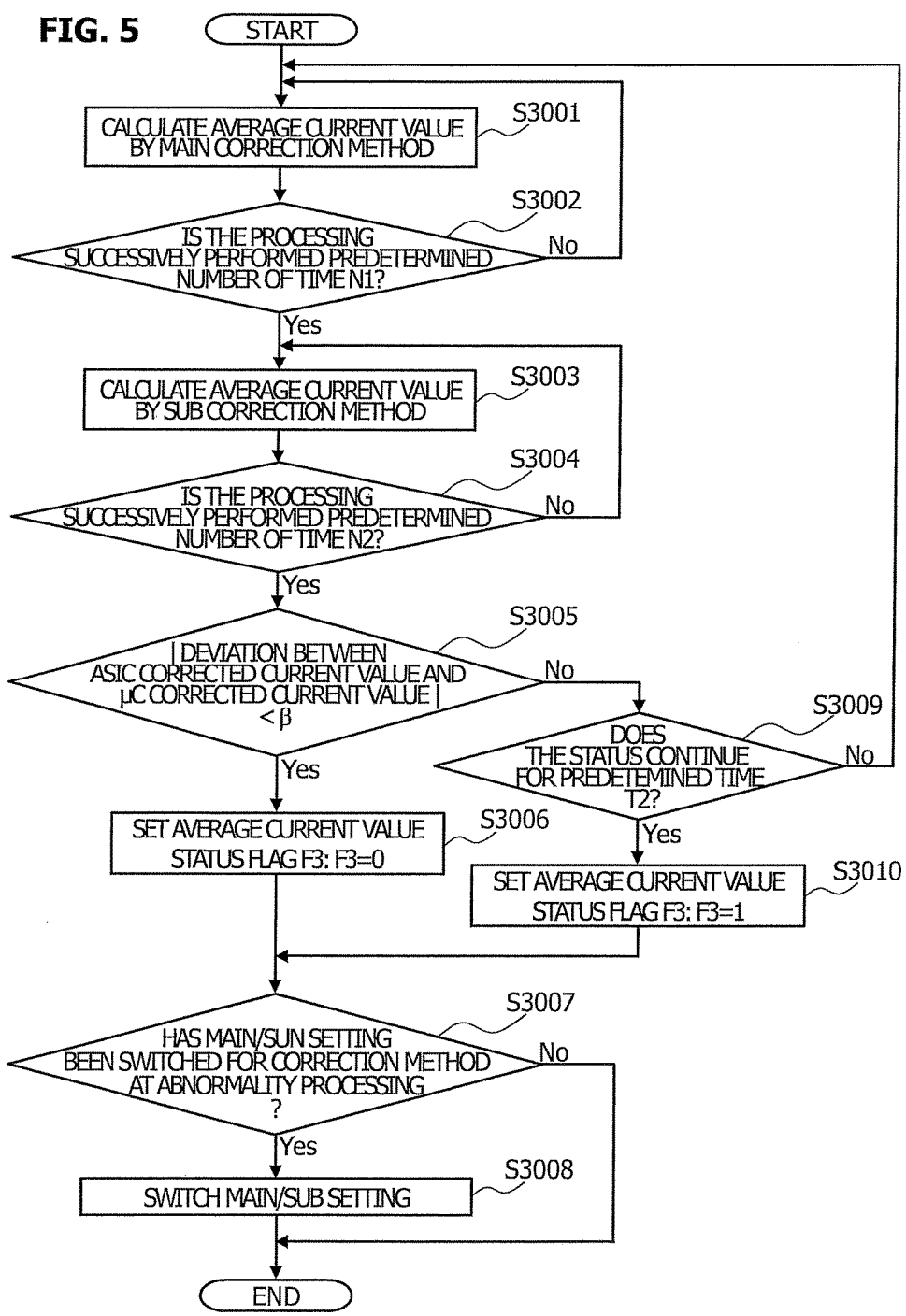
FIG. 5 is a flowchart illustrating the abnormality diagnosis processing targeted at an average current value.

FIG. 5 is a flowchart illustrating the abnormality diagnosis processing that micro-controller 100 performs when the energization status for linear solenoid 7a is at a steady state and not at a transient state after the ignition key of the vehicle is turned on. This processing is targeted at the average current value.

At step 3001, abnormality diagnosis unit 108 obtains the average current value (hereinafter called "main current value") calculated by average current calculation unit 204 when current feedback control is performed in the main correction method.

Similarly to step 3001, at step 3003, abnormality diagnosis unit 108 obtains the average current value (hereinafter called "sub current value") calculated by average current calculation unit 204 when current feedback control is performed in the sub correction method.

At step 3002, determination is made whether the processing at step 3001 is successively performed predetermined number of times N1 or not. When it is determined that the processing at step 3001 is successively performed predetermined number of times N1, the procedure shifts to step 3002 (Yes). On the contrary, when it is not determined that the processing at step 3001 is successively performed predetermined number of times N1, the procedure returns to step 3001 (No).

Similarly to step 3002, when it is determined at step 3004 that the processing at step 3003 is successively performed predetermined number of times N2, the procedure shifts to step 3005 (Yes). On the contrary, when it is not determined that the processing at step 3003 is successively performed predetermined number of times N2, the procedure returns to step 3003 (No).

The predetermined number N2 is a natural number smaller than the predetermined number N1 and is 1 or more (N1>N2≥1). These predetermined numbers N1 and N2 are multiples of the average number of times (e.g., a predetermined number of times of A/D conversion) when average current calculation unit 204 calculates the average current value. The ratio between the predetermined number of times N1 and the predetermined number of times N2 is a predetermined number of times of execution ratio, which is the criterion for feedback amount selection unit 112 to switch between the two correction methods. The main current value and the sub current value may be calculated so that a difference in level between the main current value and the sub current value can be determined clearly. For instance, an averaged current value or an effective current value which is further calculated from the main current value obtained at step 3001 with the predetermined number of times N1 may be used as a main current value used at step 3005 as described later, and an averaged current value or an effective current value which is further calculated from the sub current value obtained at step 3003 with the predetermined number of times N2 may be used as a sub current value used at step 3005 as described later. Alternatively the maximum current value and the minimum current value of the main current value obtained at step 3001 may be used as representative values of the main current value, and the maximum current value and the minimum current value of the sub current value obtained at step 3003 may be used as representative values of the sub current value.

At step 3005, abnormality diagnosis unit 108 determines whether deviation (absolute value) between the main current value and the sub current value is less than a predetermined value β (β>0) or not. The predetermined value β is a threshold as to whether the main current value obtained at step 3001 and the sub current value obtained at step 3003 have a significant difference, such as 0.5% of the main current value or the sub current value, or not.

Even when abnormality diagnosis unit 108 diagnoses that the storage and data transfer of the correction coefficient is normal in the abnormality diagnosis processing of FIG. 3 targeted at the correction coefficient and diagnoses that the calculation processing of the corrected current value at correction unit 110 and correction unit 206 is normal in the abnormality diagnosis processing of FIG. 4 targeted at the corrected current value, if there is a significant difference between the main current value obtained at step 3001 and the sub current value obtained at step 3003, any abnormality may occur in the current feedback control due to a difference in correction methods.

Therefore when it is determined at step 3005 that the deviation (absolute value) between the main current value and the sub current value is less than the predetermined value β (β>0), it is diagnosed that the current feedback control is normal, and the procedure shifts to step 3006 (Yes). On the contrary, when it is determined that the deviation (absolute value) between the main current value and the sub current value is the predetermined value β (β>0) or more, it is diagnosed that abnormality occurs at the current feedback control, and the procedure shifts to step 3009 (No).

At step 3006, abnormality diagnosis unit 108 sets a feedback status flag F3 showing the abnormal/normal status relating to the entire current feedback control at a value indicating the normal status (e.g., 0) and stores this value in volatile memory 116.

At step 3007, abnormality diagnosis unit 108 determines whether the main/sub setting of the ASIC and the microcomputer correction methods has been switched or not at the abnormality processing described later. Such a determination is performed because, when the main/sub setting of the ASIC and the microcomputer correction methods has been switched as the abnormality processing described later, if the main/sub setting of the ASIC and the microcomputer correction methods is switched again at the following step 3008, this means that no abnormality processing is performed.

Therefore when it is determined at step 3007 that the main/sub setting of the ASIC and the microcomputer correction methods has not been switched at the abnormality processing, the procedure shifts to step 3008 (Yes), where the main/sub setting of the ASIC and the microcomputer correction methods is switched. On the contrary, when it is determined at step 3007 that the main/sub setting of the ASIC and the microcomputer correction methods has been switched for the correction method at the abnormality processing, step 3008 is skipped to keep the abnormality processing, and the abnormality diagnosis processing targeted at the average current value ends (No).

The determination as to whether the main/sub setting of the ASIC and the microcomputer correction methods has been switched or not at the abnormality processing can be made by abnormality diagnosis unit 108 by reading of a flag having the values that change with such switching of the main/sub setting from volatile memory 116.

At step 3008, main/sub setting of the ASIC and the microcomputer correction methods is switched. For instance, when the main correction method is the ASIC correction method and the sub correction method is the microcontroller correction method, the main correction method is switched into the microcontroller correction method and the sub correction method is switched into the ASIC correction method at this step.

The main/sub setting of the ASIC and the microcomputer correction methods is switched at step 3008 to improve the diagnosis accuracy. This is because, even when abnormality diagnosis unit 10 diagnoses that the current feedback control is normal in the abnormality diagnosis processing, this may be diagnosed as abnormal by switching the main/sub setting of the ASIC and the microcomputer correction methods to perform the abnormality diagnosis processing.

At step 3009, abnormality diagnosis unit 108 determines whether the status having the deviation (absolute value) between the main current value and the sub current value of the predetermined value β or more continues for predetermined time T2 or not. This is for considering the case where the deviation (absolute value) between the main current value and the sub current value is the predetermined value β or more because the detected current value and accordingly the average current value or the corrected current value are influenced from temporary noise or the like, and is to avoid wrong diagnosis.

Therefore when it is determined at step 3009 that the status having the deviation (absolute value) between the main current value and the sub current value of the predetermined value β or more continues for predetermined time T2, it is diagnosed that any abnormality occurs at the current feedback control, and the procedure shifts to step 3010 (Yes). On the contrary, when it is determined that the status having the deviation (absolute value) between the main current value and the sub current value of the predetermined value β or more does not continue for predetermined time T2, the procedure returns to step 3001 (No) to diagnose again whether any abnormality occurs at the current feedback control.

At step 3010, abnormality diagnosis unit 108 sets the feedback status flag F3 showing the abnormal/normal status relating to the entire current feedback control at a value indicating the abnormal status (e.g., 1) and stores this value in volatile memory 116.

Figure 6:
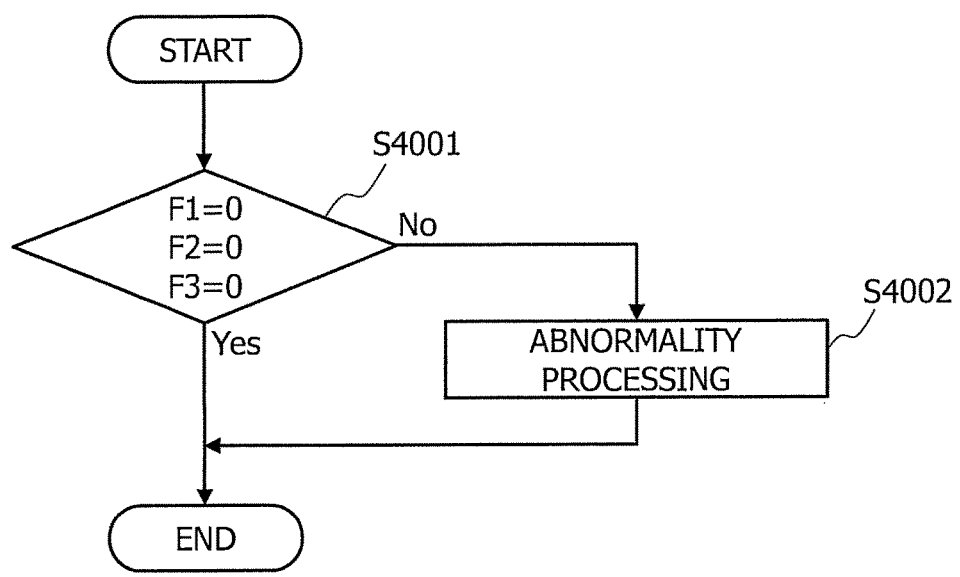
FIG. 6 is a flowchart illustrating general diagnosis processing.

FIG. 6 is a flowchart illustrating the general diagnosis processing that micro-controller 100 performs every predetermined time Δt3 after the ignition key of the vehicle is turned on.

At step 4001, abnormality diagnosis unit 108 determines whether all of the three flags of the correction coefficient status flag F1, the corrected current value status flag F2 and the feedback status flag F3 are 0 or not, so as to generally diagnose whether the ASIC correction method or the microcontroller correction method is normal or not.

When it is determined that all of the flags including the correction coefficient status flag F1, the corrected current value status flag F2 and the feedback status flag F3 are normal, it is diagnosed that all of the ASIC and the microcomputer correction methods are normal, and the general diagnosis processing ends (Yes). On the contrary, if the diagnosis shows that at least one of the correction coefficient status flag F1, the corrected current value status flag F2 and the feedback status flag F3 is abnormal, it is diagnosed that at least one of the ASIC and the microcomputer correction methods is abnormal, and the procedure shifts to step 4002 to perform the abnormality processing (No). This abnormality processing is described later.

FIG. 7 is a table illustrating specific examples of the abnormality processing. This table illustrates three patterns of the abnormality processing, depending on whether the output from the linear solenoid is diagnosed or not to determine whether the output from linear solenoid 7a is abnormal or not or depending on the result of the diagnosis.

The diagnosis of linear solenoid output can be performed as follows. For instance, abnormality diagnosis unit 108 compares the target oil pressure that is the base of the setting of the target current value at target current calculation unit 102 and the supplied oil pressure of the oil supplied from input-side pulley pressure control unit 7 to primary pulley 3b, and the diagnosis may be performed based on the result of the comparison. If a difference between the target oil pressure and the supplied oil pressure is a predetermined value or more, it may be diagnosed that the output from linear solenoid 7a is abnormal.

In the abnormality processing of pattern 1, the output from linear solenoid 7a is immediately stopped without diagnosing the linear solenoid output or irrespective of the result of diagnosis on the output from linear solenoid. Such abnormality processing is failsafe processing in the driving control of linear solenoid 7a, which prioritizes reliable prevention of a significantly problematic mode that may occur if the driving of linear solenoid 7a continues.

The output from linear solenoid 7a can be stopped by abnormality diagnosis unit 108, and abnormality diagnosis unit 108 may instruct duty ratio calculation unit 106 to set the duty ratio at 0 forcibly, for example. Alternatively a switch may be disposed to open and close a power supplying line between power supply and linear solenoid 7a, and abnormality diagnosis unit 108 of microcontroller 100 may output an opening signal to open this switch, so that the electricity supplied to linear solenoid 7a from the power supply is interrupted. In this way, the output from linear solenoid 7a may be stopped.

In the abnormality processing of pattern 2, when the diagnosis on the linear solenoid output is normal, the main/sub setting of the ASIC and the microcomputer correction methods is firstly switched. In such abnormality processing, when the diagnosis on the linear solenoid output is normal, the output from linear solenoid 7a is not immediately stopped, but the main/sub setting of the ASIC and the microcomputer correction methods is switched to diagnose the output from linear solenoid 7a, so as to keep the shift transmission function of continuously variable transmission 3. If the diagnosis on the output from linear solenoid results in abnormal after switching the main/sub setting of the ASIC and the microcomputer correction methods, failsafe processing is performed to stop the output from linear solenoid 7a immediately. This is to prevent a significantly problematic mode that may occur when the driving of linear solenoid 7a continues.

When the main/sub setting of the ASIC and the microcomputer correction methods is switched for the abnormality processing as stated above, then the switching of the main/sub setting of the ASIC and the microcomputer correction methods is disabled at step 3007 in the abnormality diagnosis processing of FIG. 5.

In the abnormality processing of pattern 3, when the diagnosis on the linear solenoid output is normal, linear solenoid 7a is not stopped and the main/sub setting of the ASIC and the microcomputer correction methods is not switched so as to prioritize the keeping of the shift transmission function of continuously variable transmission 3. If the diagnosis on the linear solenoid output changes into abnormal without switching the main/sub setting of the ASIC and the microcomputer correction methods, the main/sub setting of the ASIC and the microcomputer correction methods is firstly switched and then the output from linear solenoid 7a is diagnosed, so as to keep the shift transmission function of continuously variable transmission 3. In this way, if the diagnosis on the output from linear solenoid is still abnormal after switching the main/sub setting of the ASIC and the microcomputer correction methods, failsafe processing is performed to stop the output from linear solenoid 7a immediately. This is to prevent a significantly problematic mode that may occur when the driving of linear solenoid 7a continues.

Such a control unit 10 has a dual correction system to correct the average current value as the feedback amount in the current feedback control, and therefore can improve the reliability of the current feedback control system against malfunctions and deteriorations of a memory to store the correction coefficient and of an element to calculate the corrected current value.

The correction coefficients, corrected current values and average current values are compared between the correction systems, which enables abnormality diagnosis on the storage and data transfer of the correction coefficients and on the correction calculation processing. Further, abnormality processing is performed based on the result of diagnosis, whereby power consumption at linear solenoid 7a can be suppressed by calculating an adequate operating amount in accordance with the actual current value of linear solenoid 7a, and shift shock can be reduced when gears are shifted.

The embodiment as stated above is described about control unit 10 configured to control the driving of linear solenoid 7a in the oil supplying system of a vehicle transmission, which is an example of the control device for actuator and the method for controlling an actuator according to the present invention. The control device for actuator and the method for controlling an actuator according to the present invention are not limited to the embodiment as stated above, and they can be applied to any configuration as long as it feeds back the control amount of the actuator to regulate the operating amount for feedback control.

For instance, the control device for actuator and the method for controlling an actuator according to the present invention may be applied to a control device to perform feedback control of the driving output (control amount) of an electric actuator, such as an electric actuator in a variable valve timing mechanism (VTC: Valve Timing Control System) to change the valve timing of at least one of an intake valve and an exhaust valve of an engine 1, the electric actuator being configured to change the rotary phase of a camshaft relative to a crankshaft, an electric actuator in a variable compression ratio (VCR) system to change the top dead center of the piston of engine 1, the electric actuator being configured to change the maximum distance between the piston and the crankshaft, or an electric water pump to circulate cooling water of engine 1.

The embodiment as stated above exemplifies control unit 10 for current feedback control to feedback driving current of linear solenoid 7a as the control amount to the input side as the control device for actuator and the method for controlling an actuator according to the present invention. The present invention also may be applied to another control device to feedback another control amount, such as voltage applied to the actuator, so as to regulate the operating amount.

Figure 8:
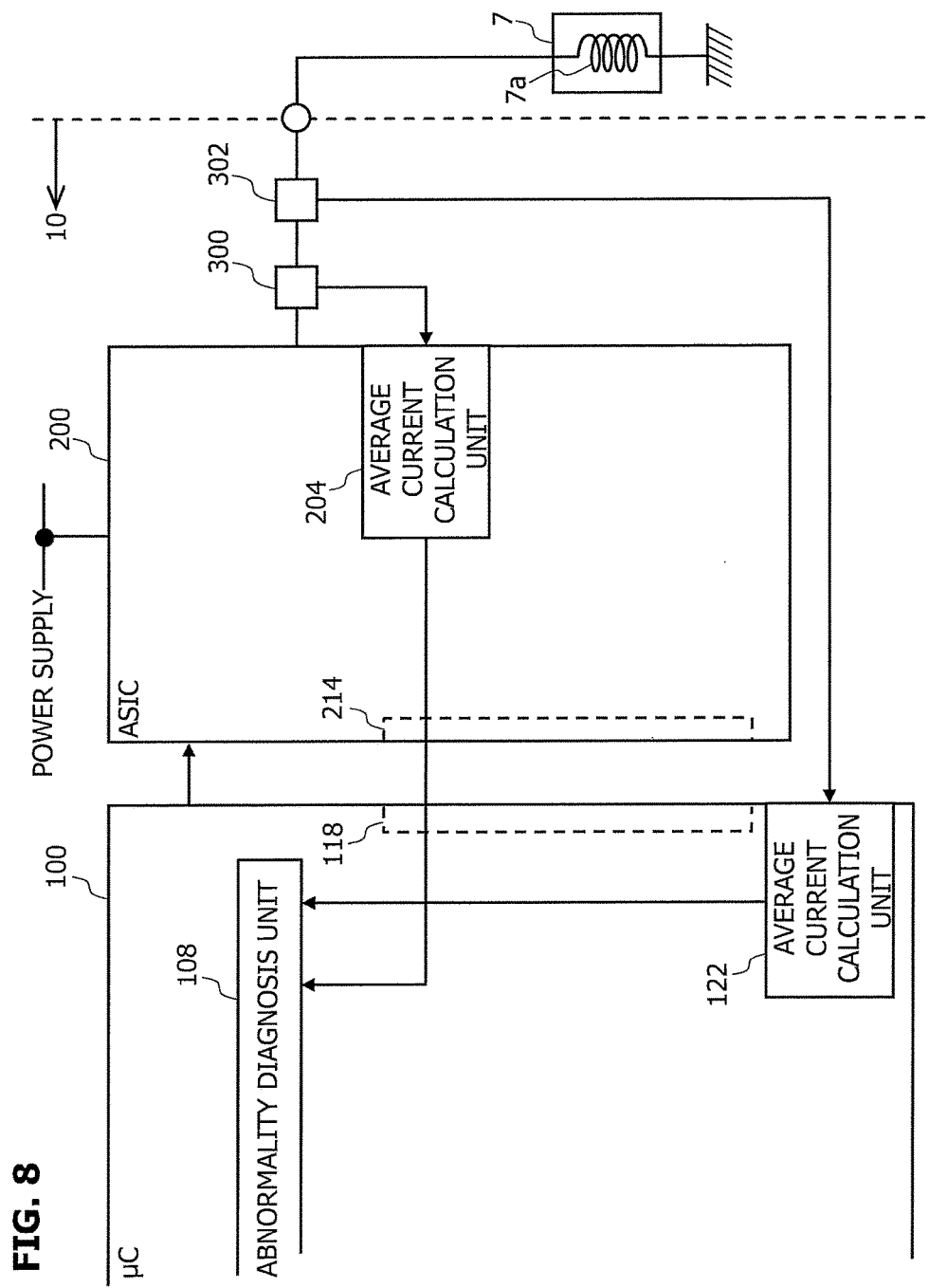
FIG. 8 is a functional block diagram illustrating another example of a control device for actuator.

As illustrated in FIG. 8, control unit 10 in the embodiment as stated above may further include a current sensor 302 between ASIC 200 and linear solenoid 7a and an average current calculation unit 122 having the same function as that of average current calculation unit 204 in microcontroller 100. In such a configuration, a detected signal by current sensor 300 is output to ASIC 200, and average current value is calculated at average current calculation unit 204. A detected signal by current sensor 302 is output to microcontroller 100, and average current value is calculated at average current calculation unit 122. Then abnormality diagnosis unit 108 can compare the two average current values. This enables diagnosis about a difference between the target current value and the corrected current value based on the result of comparison between the two average current values, and this difference results from abnormality of current sensor 300 or current sensor 302. Current sensor 300 or 302 can be correctly used as needed, whereby the reliability of the current feedback control system can be improved.

In the embodiment as stated above, general diagnosis is performed as the processing after abnormality diagnosis at step 4001. In this step, the ASIC correction method and the microcontroller correction method are diagnosed as normal when all of the three flags including the correction coefficient status flag F1, the corrected current value status flag F2 and the feedback status flag F3 are 0. Alternatively, if a determination whether the correction coefficient status flag F1 is 0 or not shows normal, then a diagnosis may be performed as to whether either one of the corrected current value and the average current value is abnormal or not, whereby general diagnosis can be performed as to whether the ASIC correction method and the microcontroller correction method are normal or not. Therefore at step 4001, general diagnosis may be performed so that the ASIC correction method and the micro-controller correction method are normal when two flags including the correction coefficient status flag F1 and either one of the corrected current value status flag F2 and the feedback status flag F3 are 0.

In the embodiment as stated above, fail-soft processing may be performed as abnormality processing, so that gear shift operation of continuously variable transmission 3 by the driver is limited, and a part of the shift transmission function of continuously variable transmission 3 is enabled.

The embodiment as stated above has a dual correction system of the average current value including microcontroller 100 and ASIC 200 for redundancy. This is not limited to microcontroller 100 and ASIC 200 as long as any dual system is provided inside of control unit 10. The correction system of average current value is not limited to dual, which may be a multiple system of triple or more.

REFERENCE SYMBOL LIST

7a Linear solenoid
10 Control unit
100 Microcontroller
102 Target current calculation unit
104 Subtraction unit
106 Duty ratio calculation unit
108 Abnormality diagnosis unit
110 Correction unit
112 Feedback amount selection unit
114 Non-volatile memory
116 Volatile memory
200 ASIC
202 Output driver
204 Average current calculation unit
206 Correction unit
208 Non-volatile memory
210 Volatile memory
300 Current sensor

The invention claimed is:

1. A control device for actuator comprising: a control circuit configured to set an operating amount of an actuator in accordance with a target control amount of the actuator;
   a driving circuit configured to supply electricity to the actuator based on the set operating amount; and
   a sensor configured to detect a control amount of the actuator, wherein
   the control circuit includes a first correction unit configured to correct the control amount detected by the sensor, and the driving circuit includes a second correction unit configured to correct the control amount detected by the sensor, and
   the control circuit performs feedback of either one of the control amount corrected by the first correction unit and the control amount corrected by the second correction unit for feedback control to regulate the operating amount.

2. The control device for actuator according to claim 1, wherein each of the control circuit and the driving circuit includes a storage memory to store a correction coefficient beforehand, the correction coefficients having a same value and being used to correct the control amounts at the first correction unit and the second correction unit, and
   the control circuit diagnoses whether the feedback control amount is abnormal or not based on the correction coefficient stored beforehand in the storage memory of the control circuit and the correction coefficient stored beforehand in the storage memory of the driving circuit.

3. The control device for actuator according to claim 2, wherein when the control circuit diagnoses that the feedback control amount is abnormal, the control circuit switches one of the control amounts feedback between the control amount corrected by the first correction unit and the control amount corrected by the second correction unit into the other control amount in the feedback control.

4. The control device for actuator according to claim 2, wherein when the control circuit diagnoses that the feedback control amount is abnormal, the control circuit stops electricity supplied to the actuator.

5. The control device for actuator according to claim 4, wherein stopping of electricity supplied to the actuator by the control circuit is performed based on a diagnosis that an output from the actuator is abnormal.

6. The control device for actuator according to claim 1, wherein the control circuit diagnoses whether the feedback control amount is abnormal or not based on the control amount corrected by the first correction unit and the control amount corrected by the second correction unit.

7. The control device for actuator according to claim 6, wherein when the control circuit diagnoses that the feedback control amount is abnormal, the control circuit switches one of the control amounts feedback between the control amount corrected by the first correction unit and the control amount corrected by the second correction unit into the other control amount in the feedback control.

8. The control device for actuator according to claim 6, wherein when the control circuit diagnoses that the feedback control amount is abnormal, the control circuit stops electricity supplied to the actuator.

9. The control device for actuator according to claim 8, wherein stopping of electricity supplied to the actuator by the control circuit is performed based on a diagnosis that an output from the actuator is abnormal.

10. The control device for actuator according to claim 1, wherein the control circuit diagnoses whether the feedback control amount is abnormal or not based on a control amount detected by the sensor when the control amount corrected by the first correction unit is fed back to calculate the operating amount and a control amount detected by the sensor when the control amount corrected by the second correction unit is feedback to calculate the operating amount.

11. The control device for actuator according to claim 10, wherein when the control circuit diagnoses that the feedback control amount is abnormal, the control circuit switches one of the control amounts feedback between the control amount corrected by the first correction unit and the control amount corrected by the second correction unit into the other control amount in the feedback control.

12. The control device for actuator according to claim 10, wherein when the control circuit diagnoses that the feedback control amount is abnormal, the control circuit stops electricity supplied to the actuator.

13. The control device for actuator according to claim 12, wherein stopping of electricity supplied to the actuator by the control circuit is performed based on a diagnosis that an output from the actuator is abnormal.

14. A method for controlling an actuator to control electricity supplied to the actuator based on an operating amount of the actuator set in accordance with a target control amount of the actuator, wherein
   a controller of the actuator includes:
   a first correction unit configured to correct a control amount of the actuator detected and a second correction unit configured to correct a control amount of the actuator detected, and
   feedback control to regulate the operating amount of the actuator is performed based on any one of the control amount corrected by the first correction unit and the control amount corrected by the second correction unit, and the target control amount.

\* \* \* \* \*